US009781617B2

United States Patent
Chen et al.

(10) Patent No.: US 9,781,617 B2
(45) Date of Patent: Oct. 3, 2017

(54) METHOD AND TERMINAL FOR DETERMINING FREQUENCY TO BE MEASURED

(71) Applicant: Huawei Technologies Co., Ltd., Shenzhen (CN)

(72) Inventors: Yanyan Chen, Shenzhen (CN); Bingzhao Li, Beijing (CN); Yu Gong, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 118 days.

(21) Appl. No.: 14/538,487

(22) Filed: Nov. 11, 2014

(65) Prior Publication Data

US 2015/0063156 A1    Mar. 5, 2015

Related U.S. Application Data

(63) Continuation of application No. PCT/CN2012/075384, filed on May 11, 2012.

(51) Int. Cl.
*H04W 24/08*   (2009.01)
*H04W 48/16*   (2009.01)

(52) U.S. Cl.
CPC ............ *H04W 24/08* (2013.01); *H04W 48/16* (2013.01)

(58) Field of Classification Search
CPC ...... H04W 24/10; H04W 36/12; H04W 36/20
See application file for complete search history.

(56) References Cited

U.S. PATENT DOCUMENTS

| 8,355,724 B2 | 1/2013 | Iwamura et al. |
| 2011/0065433 A1 | 3/2011 | Iwamura et al. |
| 2013/0029666 A1* | 1/2013 | Jung ................. H04W 36/0083 455/436 |

FOREIGN PATENT DOCUMENTS

| CN | 101212764 A | 7/2008 |
| CN | 101527940 A | 9/2009 |

(Continued)

OTHER PUBLICATIONS

"Number of UTRAN and Inter-RAT Frequencies," 3GPP TSG-RAN2 Meeting #27, Orlando, Florida, R2-020517, 3rd Generation Partnership Project, Valbonne, France (Feb. 18-22, 2002).

(Continued)

*Primary Examiner* — Chandrahas Patel
(74) *Attorney, Agent, or Firm* — Leydig, Voit & Mayer, Ltd.

(57) ABSTRACT

The present application provides a method and a terminal for determining a frequency to be measured. The terminal receives frequency information about an inter-frequency measurement object and frequency priority information about the inter-frequency measurement object, and determines the number of at least one frequency for the received inter-frequency measurement object according to the frequency information, and when the number of the at least one frequency for the received inter-frequency measurement object is greater than the number of at least one frequency for an inter-frequency measurement object supported by the terminal, the terminal is capable of selecting, according to the frequency priority information, at least one frequency to be measured from the at least one frequency for the received inter-frequency measurement object, wherein the number of the at least one frequency to be measured is equal to the (Continued)

number of frequencies for the inter-frequency measurement object supported by the terminal.

16 Claims, 2 Drawing Sheets

(56) References Cited

FOREIGN PATENT DOCUMENTS

| | | |
|---|---|---|
| CN | 101978729 A | 2/2011 |
| EP | 2587857 A2 | 5/2013 |
| WO | WO 2009119565 A1 | 10/1999 |

OTHER PUBLICATIONS

"$3^{rd}$ Generation Partnership Project; Technical Specification Group Radio Access Network; Evolved Universal Terrestrial Radio Access (E-UTRA); User Equipment (UE) Radio Transmission and Reception (Release 11)," 3GPP TS 36.101, V11.0.0, pp. 1-316, $3^{rd}$ Generation Partnership Project, Valbonne, France (Mar. 2012).

"$3^{rd}$ Generation Partnership Project; Technical Specification Group Radio Access Network; Evolved Universal Terrestrial Radio Access (E-UTRA); Base Station (BS) Radio Transmission and Reception (Release 11)," 3GPP TS 36.104, V11.0.0, pp. 1-120, $3^{rd}$ Generation Partnership Project, Valbonne, France (Mar. 2012).

"$3^{rd}$ Generation Partnership Project; Technical Specification Group Radio Access Network; Requirements for support of radio resource management (FDD) (Release 11)," 3GPP TS 25.133, V11.0.0, pp. 1-270, $3^{rd}$ Generation Partnership Project, Valbonne, France (Mar. 2012).

\* cited by examiner

METHOD AND TERMINAL FOR DETERMINING FREQUENCY TO BE MEASURED

CROSS-REFERENCE TO RELATED APPLICATIONS

This application is a continuation of International Patent Application No. PCT/CN2012/075384, filed on May 11, 2012, which is hereby incorporated by reference in its entirety.

TECHNICAL FIELD

The present application relates to the field of communications technologies, and in particular, to a method and a terminal for determining a frequency to be measured.

BACKGROUND

In a wireless communications system, for example, in a wideband code division multiple access (Wideband Code Division Multiple Access, referred to as WCDMA) system, a terminal may measure an inter-frequency frequency in a UMTS FDD system and/or a frequency in a long term evolution (Long Term Evolution, referred to as LTE) system. In the prior art, the maximum number of frequencies including a working frequency that are simultaneously measured by a terminal is limited, for example, 8 frequencies.

However, a base station may configure for the terminal a total number of working frequencies and inter-frequency frequencies and/or inter-system frequencies which is greater than the limited number; and the prior art does not specify which frequency may be selected by the terminal to measure, which results in a decrease in a frequency measurement capability of the terminal.

SUMMARY

A plurality of aspects of the present application provides a method and a terminal for determining a frequency to be measured, which are used to improve a frequency measurement capability of the terminal.

One aspect of the present application provides a method for determining a frequency to be measured, including: receiving, by a terminal, frequency information about an inter-frequency measurement object and frequency priority information about the inter-frequency measurement object; determining, by the terminal, the number of at least one frequency for the received inter-frequency measurement object according to the frequency information; and when the determined number of the at least one frequency for the received inter-frequency measurement object is greater than the number of at least one frequency for an inter-frequency measurement object supported by the terminal, selecting, by the terminal, at least one frequency to be measured from the at least one frequency for the received inter-frequency measurement object according to the frequency priority information, wherein the number of the at least one frequency to be measured is equal to the number of the at least one frequency for the inter-frequency measurement object supported by the terminal.

Another aspect of the present application provides a terminal, including: a receiver, configured to receive frequency information about an inter-frequency measurement object and frequency priority information about the inter-frequency measurement object; a determining processor, configured to determine the number of at least one frequency for the received inter-frequency measurement object according to the frequency information; and a selecting processor, configured to select, when the number of the at least one frequency for the received inter-frequency measurement object determined by the determining processor is greater than the number of at least one frequency for an inter-frequency measurement object supported by the terminal, according to the frequency priority information, at least one frequency to be measured from the at least one frequency for the received inter-frequency measurement object, wherein the number of the at least one frequency to be measured is equal to the number of the at least one frequency for the inter-frequency measurement object supported by the terminal.

According to the foregoing technical solutions, these solutions can solve the problem in the prior art that a base station configures a terminal with frequencies more than the sum of working frequencies and inter-frequency frequencies and/or inter-system frequencies supported by the terminal, thereby improving a frequency measurement capability of the terminal

BRIEF DESCRIPTION OF DRAWINGS

To illustrate the technical solutions in the embodiments of the present application or in the prior art more clearly, the following briefly introduces the accompanying drawings required for describing the embodiments or the prior art. Apparently, the accompanying drawings in the following description show merely some embodiments of the present application, and persons of ordinary skill in the art may still derive other drawings from these accompanying drawings without creative efforts.

DESCRIPTION OF EMBODIMENTS

To make the objectives, technical solutions, and advantages of the embodiments of the present application more clearly, the following clearly describes the technical solutions in the embodiments of the present application with reference to the accompanying drawings in the embodiments of the present application. Apparently, the described embodiments are merely a part rather than all of the embodiments of the present application. All other embodiments obtained by persons of ordinary skill in the art based on the embodiments of the present application without creative efforts shall fall within the protection scope of the present application.

The technical solutions of the present application may be applied to various wireless communications systems, for example, a global system for mobile communications (Global System for Mobile Communications, referred to as GSM), a general packet radio service (General Packet Radio Service, referred to as GPRS) system, a code division multiple access (Code Division Multiple Access, referred to as CDMA) system, and a CDMA2000 system, a universal mobile telecommunication system (Universal Mobile Telecommunication System, UMTS), a long term evolution (Long Term Evolution, referred to as LTE) system, or world interoperability for microwave access (World Interoperability for Microwave Access, referred to as WiMAX) system and the like.

A base station, may be a base station (Base Transceiver Station, referred to as BTS) in the GSM system, the GPRS system, or the CDMA system, and may also be a base station (NodeB) in the CDMA2000 system or the UMTS system, and may also be an evolved base station (Evolved NodeB, referred to as eNB) in the LTE system, and may also be an access service network base station (Access Service Network Base Station, referred to as ASN BS) in a WiMAX network, and other network elements.

In addition, the term "and/or" in this document is only an association relationship for describing the associated objects, and represents that three relationships may exist, for example, A and/or B may represent the following three cases: A exists separately, both A and B exist, and B exists separately. In addition, the symbol "/" in this document usually represents that associated objects before and after the symbol are in an "or" relationship.

Figure 1:
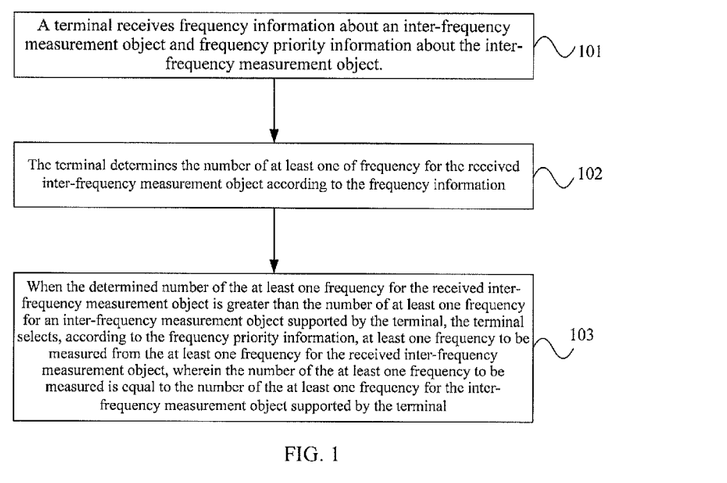
FIG. 1 is a schematic flowchart of a method for determining a frequency to be measured according to an embodiment of the present application.

FIG. 1 is a schematic flowchart of a method for determining a frequency to be measured according to an embodiment of the present application, as shown in FIG. 1.

101: A terminal receives frequency information about an inter-frequency measurement object and frequency priority information about the inter-frequency measurement object.

The inter-frequency measurement object may include but is not limited to an intra-system inter-frequency frequency and/or an inter-system frequency. Correspondingly, the frequency information about the inter-frequency measurement object may include but is not limited to frequency information about the intra-system inter-frequency frequency and/or the frequency information about the inter-system frequency.

For example, when the terminal works on a UMTS system at present, the frequency information about the inter-frequency measurement object may include at least one of the following: inter-frequency frequency information about a UMTS system that does not use a frequency (working frequency) on which a UMTS serving cell camps at present, frequency information about an LTE frequency division duplexing (Frequency Division Duplexing, FDD) system, frequency information about an LTE time division duplexing (Time Division Duplexing, TDD) system, frequency information about a GSM system, and frequency information about another system (such as frequency information about a CDMA2000 system).

For example, when the terminal works on the LTE system at present, the frequency information about the inter-frequency measurement object may include at least one of the following: inter-frequency frequency information about an LTE system that does not use a frequency (working frequency) on which an LTE serving cell camps at present, frequency information about a UMTS frequency division duplexing (Frequency Division Duplexing, FDD) system, frequency information about a UMTS time division duplexing (Time Division Duplexing, TDD) system, frequency information about the GSM system, and frequency information about another system (such as frequency information about the CDMA2000 system).

102: The terminal determines the number of at least one of frequency for the received inter-frequency measurement object according to the frequency information.

Specifically, the number of pieces about the frequency information may be determined as the number of the at least one frequency for the inter-frequency measurement object.

103: When the determined number of the at least one frequency for the received inter-frequency measurement object is greater than the number of at least one frequency for an inter-frequency measurement object supported by the terminal, the terminal selects, according to the frequency priority information, at least one frequency to be measured from the at least one frequency for the received inter-frequency measurement object, wherein the number of the at least one frequency to be measured is equal to the number of the at least one frequency for the inter-frequency measurement object supported by the terminal.

Optionally, in an optional implementation manner of this embodiment, the number of the at least one frequency for the inter-frequency measurement object supported by the terminal is represented by A, and the number of the at least one frequency for the received inter-frequency measurement object determined by performing 102 is represented by B, where B is greater than A. In this case, performing 103 may be understood as selecting A frequencies (that is A inter-frequency measurement objects) from B inter-frequency measurement objects (that is, the inter-frequency measurement objects may include but are not limited to the intra-system inter-frequency frequencies and/or the inter-system frequencies) as the frequencies to be measured.

Optionally, in an optional implementation manner of this embodiment, after performing 103, the terminal may further perform a first measurement on the at least one frequency to be measured, where the first measurement refers to a measurement that meets a preset measurement indicator.

Optionally, in an optional implementation manner of this embodiment, after performing 103, the terminal may further perform a second measurement on a frequency except the at least one frequency to be measured in the inter-frequency measurement object, where the second measurement refers to a measurement that does not meet the preset measurement indicator; or may not perform a measurement on the frequency except the at least one frequency to be measured in the inter-frequency measurement object.

Optionally, in an optional implementation manner of this embodiment, the number of the at least one frequency for the inter-frequency measurement object supported by the terminal may include but is not limited to at least one of the following: the number of at least one frequency obtained according to a frequency measurement capability corresponding to a type of the inter-frequency measurement object; and the number of at least one frequency obtained according to a frequency simultaneous measurement capability on an intra-system inter-frequency frequency and an inter-system frequency supported by the terminal.

Specifically, the terminal may, determine the type of the received inter-frequency measurement object according to the received frequency information about the inter-frequency measurement object, and then obtain, according to the frequency measurement capability corresponding to the type of the received inter-frequency measurement object, the number of the at least one frequency for the inter-frequency measurement object supported by the terminal; and/or, the terminal may obtain, according to the frequency measurement capability of the intra-system inter-frequency frequency and inter-system frequency supported by the terminal, the number of the at least one frequency for the inter-frequency measurement object supported by the terminal. For example, if the type of the inter-frequency measurement object corresponding to the frequency information about the inter-frequency measurement object received by the terminal includes the LTE FDD system, the LTE TDD system, the UMTS FDD system, and intra-system inter-frequency, the number of the at least one frequency obtained by the terminal may be as follows:

1. The number of frequencies for the LTE FDD supported by the terminal is 4;
2. The number of frequencies for the LTE TDD supported by the terminal is 4;
3. The number of frequencies for the UMTS FDD system supported by the terminal is 3;
4. The number of intra-system inter-frequency (such as the GSM system) frequencies supported by the terminal is 2; and
5. The number of intra-system inter-frequency frequencies and inter-system frequencies supported by the terminal is 8.

For example, when the terminal works on the GSM system at present, if the type of an inter-frequency measurement object is an inter-frequency frequency for the UMTS system, the number of the at least one frequency for the inter-frequency measurement object supported by the terminal may refer to the number of at least one frequency for the UMTS system supported by the terminal.

For example, when the terminal works on the GSM system at present, the number of intra-system inter-frequency frequencies and inter-system frequencies supported by the system is the number of the inter-frequency frequencies for the GSM system, the frequencies for the UMTS system, the frequencies for the LTE FDD system, the frequencies for the LTE TDD system, and the frequencies for other systems (such as the frequencies for the CDMA2000 system).

Optionally, in an optional implementation manner of this embodiment, in 101, the terminal may specifically receive a system broadcast message or a dedicated control signaling, where the system broadcast message (System Information) or the dedicated control signaling comprises the frequency priority information about the inter-frequency measurement object. For example, the dedicated control signaling may be a radio resource control (Radio Resource Control, RRC) message, and specifically an information element (Information Element, IE) in the RRC message may be used to carry the frequency priority information about the inter-frequency measurement object. The RRC message may be an RRC message in the prior art, for example, a measurement control (measurement control) message, or a UMTS territorial radio access network (UMTS Territorial Radio Access Network, referred to as UTRAN) mobility information (UTRAN mobility information) message, or an RRC connection release (RRC Connection Release) message, which is not limited in this embodiment, and the IE in an existing RRC message is extended to carry the frequency priority information about the inter-frequency measurement object; or the RRC message may be different from the existing RRC message in the prior art. For another example, the dedicated control signaling may also be a media access control (Media Access Control, MAC) control element (Control Element, CE) message, the frequency priority information about the inter-frequency measurement object is carried by adding a new MAC CE.

Optionally, in an optional implementation manner of this embodiment, in 103, the terminal selects, according to the frequency priority information, N frequencies with the highest priority from the at least one frequency for the received inter-frequency measurement object, where the N refers to the number of the at least one frequency for the inter-frequency measurement object supported by the terminal. Further, when the frequency information about the inter-frequency measurement object includes frequency information about an intra-system inter-frequency frequency and frequency information about an inter-system frequency, N=M−1, where the M refers to the sum of the numbers of at least one intra-frequency frequency, at least one intra-system inter-frequency frequency, and at least one inter-system frequency supported by the terminal.

Optionally, in an optional implementation manner of this embodiment, in 103, in the process for the terminal to select N frequencies with the highest priority from the at least one frequency for the inter-frequency measurement object, when the terminal needs to select n1 frequencies corresponding to a piece of frequency priority information from the at least one frequency for the received inter-frequency measurement object and the piece of frequency priority information corresponds to n2 frequencies, and the n2 is greater than the n1, the terminal selects, according to a receive sequence or a storage sequence of the n2 frequencies, the first n1 frequencies from the n2 frequencies.

To make the method provided by the embodiment of the present application more clearly, the following uses a terminal that works on a frequency $F_{G1}$ in a GSM network at present as an example.

The terminal may receive the frequency information about the intra-system inter-frequency frequency and/or the frequency information about the inter-system frequency sent by a base station, that is, frequencies $F_{Lf1}$, $F_{Lf2}$, $F_{Lf3}$, $F_{Lf4}$, and $F_{Lf5}$ in the LTE FDD system; frequencies $F_{U1}$, $F_{U2}$, and $F_{U3}$ in the UMTS FDD system, and intra-system inter-frequency frequencies $F_{G2}$ and $F_{G3}$; and the number of the at least one frequency obtained by the terminal may be as follows:

1. The number of frequencies for the LTE FDD supported by the terminal is 4;
3. The number of frequencies for the UMTS FDD system supported by the terminal is 3;
4. The number of inter-frequency frequencies for the GSM system supported by the terminal is 2; and
5. The number of intra-system inter-frequency frequencies and inter-system frequencies supported by the terminal is 8.

The terminal may also receive the frequency priority information about the inter-frequency measurement object sent by the base station, and for the specific contents of the frequency priority information about the inter-frequency measurement object, reference may be made to Table 1.

TABLE 1

| Frequency priority information about the inter-frequency measurement object | |
| --- | --- |
| Priority | Frequency |
| 0 (highest priority) | $F_{Lf1}$, $F_{Lf2}$, and $F_{Lf3}$ |
| 1 | $F_{Lf4}$ and $F_{Lf5}$ |
| 2 | $F_{U1}$, $F_{U2}$, and $F_{U3}$ |
| 3 | $F_{G2}$ and $F_{G3}$ |

The specific selection process of the terminal is as follows:

A: At this time, since the terminal only supports a measurement on 4 frequencies for the LTE FDD system, 4 frequencies need to be selected from $F_{Lf1}$, $F_{Lf2}$, $F_{Lf3}$, $F_{Lf4}$, and $F_{Lf5}$1; the frequencies $F_{Lf1}$, $F_{Lf2}$, and $F_{Lf3}$ with a high priority are selected first, and then one frequency is selected from $F_{Lf4}$ and $F_{Lf5}$; and as $F_{Lf4}$ and $F_{Lf5}$ have the same priority, the terminal may select, according to the receive sequence or the storage sequence of $F_{Lf4}$ and $F_{Lf5}$ (for example, the sequence of appearance in EUTRA_FRE-QUENCY_INFO_LIST), the former $F_{Lf4}$ from $F_{Lf4}$ and $F_{Lf5}$.

B: At this time, there are a total of 10 frequencies for all the systems, that is, $F_{Lf1}$, $F_{Lf2}$, $F_{Lf3}$, $F_{Lf4}$, $F_{U1}$, $F_{U2}$, $F_{U3}$, $F_{G2}$, and $F_{G3}$, and the current working frequency of the terminal $F_{G1}$. However, the terminal only can simultaneously measure 8 frequencies, and besides one working frequency, can further measure 7 frequencies. Therefore, the terminal need to further select $F_{Lf1}$, $F_{Lf2}$, $F_{Lf3}$, $F_{Lf4}$, $F_{U1}$, $F_{U2}$, and $F_{U3}$ with a high priority as the frequencies to be measured by the terminal.

Then, the terminal may perform a measurement that meets the preset measurement indicator on $F_{Lf1}$, $F_{Lf2}$, $F_{Lf3}$, $F_{Lf4}$, $F_{U1}$, $F_{U2}$, and $F_{U3}$; and perform a measurement that does not meet the preset measurement indicator on $F_{Lf5}$, $F_{G2}$, and $F_{G3}$; or may not perform the measurement.

In this embodiment, the terminal receives the frequency information about the inter-frequency measurement object and the frequency priority information about the inter-frequency measurement object, and determines the number of the at least one frequency for the received inter-frequency measurement object further according to the frequency information, and when the determined number of the at least one frequency for the received inter-frequency measurement object is greater than the number of the at least one frequency for an inter-frequency measurement object supported by the terminal, the terminal is capable of selecting, according to the frequency priority information, at least one frequency to be measured from the at least one frequency for the received inter-frequency measurement object, wherein the number of the at least one frequency to be measured is equal to the number of the at least one frequency for the inter-frequency measurement object supported by the terminal. This can solve the problem in the prior art that a base station configures a terminal with frequencies more than the sum of working frequencies and inter-frequency frequencies and/or inter-system frequencies supported by the terminal, thereby improving a frequency measurement capability of the terminal.

It should be noted that, for a brief description, the foregoing method embodiments are represented as a series of actions. But persons skilled in the art should be aware that the present application is not limited to the order of the described actions, because according to the present application, some steps may adopt other order or occur simultaneously. In addition, persons skilled in the art should also aware that the described embodiments all belong to preferable embodiments, and the involved actions and modules are not necessarily required by the present application.

In the foregoing embodiments, the description of each embodiment has respective focuses. For a part that is not described in detail in a certain embodiment, reference may be made to related descriptions in other embodiments.

Figure 2:
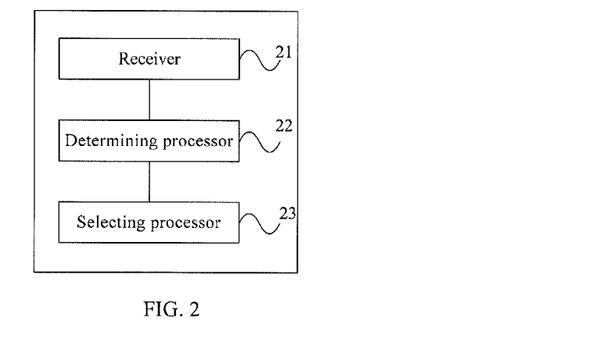
FIG. 2 is a schematic structural diagram of a terminal according to another embodiment of the present application.

FIG. 2 is a schematic structural diagram of a terminal according to another embodiment of the present application. As shown in FIG. 2, the terminal provided in this embodiment may include a receiver 21, a determining processor 22, and a selecting processor 23.

The receiver 21 is configured to receive frequency information about an inter-frequency measurement object and frequency priority information about the inter-frequency measurement object; the determining processor 22 is configured to determine the number of at least one frequency for the received inter-frequency measurement object according to the frequency information; and the selecting processor 23 is configured to select, when the number of the at least one frequency for the received inter-frequency measurement object determined by the determining processor 22 is greater than the number of at least one frequency for an inter-frequency measurement object supported by the terminal, according to the frequency priority information, at least one frequency to be measured from the at least one frequency for the received inter-frequency measurement object, wherein the number of the at least one frequency to be measured is equal to the number of the at least one frequency for the inter-frequency measurement object supported by the terminal.

The received inter-frequency measurement object may include but is not limited to an intra-system inter-frequency frequency and/or an inter-system frequency. Correspondingly, the frequency information about the inter-frequency measurement object received by the receiver 21 may include but is not limited to frequency information about the intra-system inter-frequency frequency and/or frequency information about the inter-system frequency.

For example, when the terminal works on a UMTS system at present, the frequency information about the inter-frequency measurement object may include at least one of the following: inter-frequency frequency information about a UMTS system that does not use a frequency (working frequency) on which a UMTS serving cell camps at present, frequency information about an LTE frequency division duplexing (Frequency Division Duplexing, FDD) system, frequency information about an LTE time division duplexing (Time Division Duplexing, TDD) system, frequency information about a GSM system, and frequency information about another system (such as frequency information about a CDMA2000 system).

For example, when the terminal works on the LTE system at present, the frequency information about the inter-frequency measurement object may include at least one of the following: inter-frequency frequency information about an LTE system that does not use a frequency (working frequency) on which an LTE serving cell camps at present, frequency information about a UMTS frequency division duplexing (Frequency Division Duplexing, FDD) system, frequency information about a UMTS time division duplexing (Time Division Duplexing, TDD) system, frequency information about the GSM system, and frequency information about another system (such as frequency information about the CDMA2000 system).

Optionally, in an optional implementation manner of this embodiment, the number of the at least one frequency for the inter-frequency measurement object supported by the terminal includes at least one of the following:

the number of at least one frequency obtained according to a frequency measurement capability corresponding to a type of the inter-frequency measurement object; and the number of at least one frequency obtained according to a frequency simultaneous measurement capability of an intra-system inter-frequency frequency and an inter-system frequency supported by the terminal.

Optionally, in an optional implementation manner of this embodiment, the number of the at least one frequency for the inter-frequency measurement object supported by the terminal is represented by A, and the number of the at least one frequency for the received inter-frequency measurement object determined by the determining processor 22 is represented by B, where B is greater than A. In this case, the selecting processor 23 may specifically select A frequencies (that is A inter-frequency measurement objects) from B inter-frequency measurement objects (that is, the inter-frequency measurement objects may include but are not limited to the intra-system inter-frequency frequencies and/or the inter-system frequencies) as the frequencies to be measured.

Figure 3:
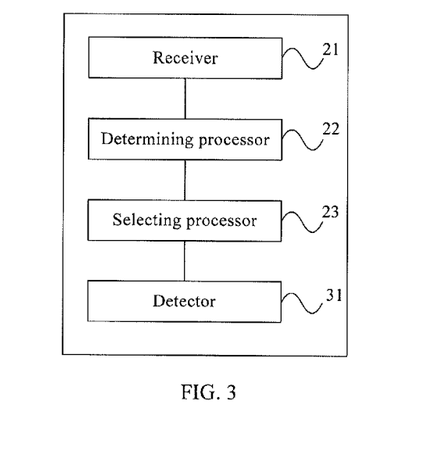
FIG. 3 is a schematic structural diagram of a terminal according to another embodiment of the present application.

Optionally, in an optional implementation manner of this embodiment, as shown in FIG. 3, the terminal provided in this embodiment may further include a detector 31, which is configured to perform a first measurement on the at least one frequency to be measured, where the first measurement refers to a measurement that meets a preset measurement indicator.

Optionally, in an optional implementation manner of this embodiment, the detector 31 may further perform a second measurement on a frequency except the at least one frequency to be measured in the inter-frequency measurement object, where the second measurement refers to a measurement that does not meet the preset measurement indicator; or may not perform a measurement on the frequency except the at least one frequency to be measured in the inter-frequency measurement object.

Optionally, in an optional implementation manner of this embodiment, the number of the at least one frequency for the inter-frequency measurement object supported by the terminal may include but is not limited to at least one of the following:

the number of at least one frequency obtained according to a frequency measurement capability corresponding to a type of the inter-frequency measurement object; and the number of at least one frequency obtained according to a frequency simultaneous measurement capability of an intra-system inter-frequency frequency and an inter-system frequency supported by the terminal.

Optionally, in an optional implementation manner of this embodiment, the receiver 21 may specifically receive a system broadcast message or a dedicated control signaling, where the system broadcast message or the dedicated control signaling comprises the frequency priority information about the inter-frequency measurement object. For example, the dedicated control signaling may be a radio resource control (Radio Resource Control, RRC) message, and specifically an information element (Information Element, IE) in the RRC message may be used to carry the frequency priority information about the inter-frequency measurement object. The RRC message may be an RRC message in the prior art, for example, a measurement control (measurement control) message, or a UMTS territorial radio access network (UMTS Territorial Radio Access Network, referred to as UTRAN) mobility information (UTRAN mobility information) message, which is not limited in this embodiment, and the IE in an existing RRC message is extended to carry the frequency priority information about the inter-frequency measurement object; or the RRC message may be different from the existing RRC message in the prior art. For another example, the dedicated control signaling may also be a media access control (Media Access Control, MAC) control element (Control Element, CE) message, the frequency priority information about the inter-frequency measurement object is carried by adding a new MAC CE.

Optionally, in an optional implementation manner of this embodiment, the selecting processor 23, may specifically select, according to the frequency priority information, N frequencies with the highest priority from the at least one frequency for the inter-frequency measurement object, where the N refers to the number of the at least one frequency for the inter-frequency measurement object supported by the terminal. Further, when the frequency information about the inter-frequency measurement object includes frequency information about an intra-system inter-frequency frequency and frequency information about an inter-system frequency, $N=M-1$, where the M refers to the sum of the numbers of at least one intra-frequency frequencies, at least one intra-system inter-frequency frequencies, and at least one inter-system frequencies supported by the terminal.

Optionally, in an optional implementation manner of this embodiment, the selecting processor 23 may specifically, when the selecting processor 23 needs to select n1 frequencies corresponding to a piece of frequency priority information from the at least one frequency for the received inter-frequency measurement object and the frequency priority information corresponds to n2 frequencies, and the n2 is greater than the n1, the terminal selects, according to a receive sequence or a storage sequence of the n2 frequencies, the first n1 frequencies from the n2 frequencies.

In this embodiment, in the terminal, the receiver receives the frequency information about the inter-frequency measurement object and the frequency priority information about the inter-frequency measurement object, and then the determining processor determines the number of the at least one frequency for the received inter-frequency measurement object according to the frequency information, so that when the number of the at least one frequency for the received inter-frequency measurement object determined by the determining processor is greater than the number of at least one frequency for an inter-frequency measurement object supported by the terminal, the selecting processor is capable of selecting at least one frequency to be measured from the at least one frequency for the received inter-frequency measurement object according to the frequency priority information, wherein the number of the at least one frequency to be measured is equal to the number of the at least one frequency for the inter-frequency measurement object supported by the terminal. This can solve the problem in the prior art that a base station configures a terminal with frequencies more than the sum of working frequencies and inter-frequency frequencies and/or inter-system frequencies supported by the terminal, thereby improving a frequency measurement capability of the terminal.

Persons skilled in the art may clearly understand that, for the purpose of convenient and brief description, for a detailed working process of the foregoing system, apparatus and unit, reference may be made to the corresponding process in the method embodiments, and the details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces; and the indirect couplings or communication connections between the apparatuses or units may be implemented in electronic, mechanical or other forms.

The units described as separate parts may or may not be physically separate, and parts displayed as units may or may not be physical units, may be located in one position, or may be distributed on a plurality of network units. A part or all of the units may be selected according to an actual need to achieve the objectives of the solutions of the embodiments.

In addition, functional units in the embodiments of the present application may be integrated into one processing unit, or each of the units may exist alone physically, or two or more units may be integrated into one unit. The integrated unit may be implemented in a form of hardware, or may also be implemented in a form of hardware plus a software functional module.

The integrated unit implemented in the form of software functional unit may be stored in a computer readable storage medium. The software functional unit is stored in a storage medium, and contains several instructions used to instruct computer equipment (for example, a personal computer, a server, or network equipment) to perform some steps of the methods in the embodiments of the present application. The storage medium includes: any medium that can store program codes, such as a U disk, a removable hard disk, a read-only memory (Read-Only memory, ROM), a random access memory (Random Access Memory, RAM), a magnetic disk, or an optical disk.

Finally, it should be noted that the foregoing embodiments are merely intended for describing the technical solutions of the present application other than limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present application.

What is claimed is:

1. A method for determining a frequency to be measured the method comprising:
   receiving, by a terminal, frequency information about an inter-frequency measurement object and frequency priority information about the inter-frequency measurement object, from a base station;
   determining, by the terminal, the number of at least one first frequency for the received inter-frequency measurement object according to the frequency information; and
   when the determined number of the at least one first frequency is greater than the number of at least one second frequency for an inter-frequency measurement object supported by the terminal, selecting, by the terminal, at least one frequency to be measured from the at least one first frequency according to the frequency priority information, wherein the number of the at least one frequency to be measured is equal to the number of the at least one second frequency;
   wherein selecting the at least one frequency to be measured from the at least one first frequency comprises:
   selecting, by the terminal, according to the frequency priority information, N frequencies with the highest priority from the at least one first frequency, wherein the N refers to the number of the at least one second frequency.

2. The method according to claim 1, wherein the at least one second frequency comprises at least one of the following:
   frequencies obtained according to a frequency measurement capability corresponding to a type of the inter-frequency measurement object; and
   frequencies obtained according to a frequency simultaneous measurement capability of an intra-system inter-frequency frequency and an inter-system frequency supported by the terminal.

3. The method according to claim 1, wherein the frequency information about the inter-frequency measurement object comprises at least one of (a) frequency information about an intra-system inter-frequency frequency and (b) frequency information about an inter-system frequency.

4. The method according to claim 1, wherein after the selecting N frequencies with the highest priority to be measured from the at least one first frequency according to the frequency priority information, the method further comprises:
   performing, by the terminal, a first measurement on the N frequencies, wherein the first measurement refers to a measurement that meets a preset measurement indicator.

5. The method according to claim 1, wherein receiving the frequency priority information about the inter-frequency measurement object comprises:
   receiving, by the terminal, a system broadcast message or a dedicated control signaling, wherein the system broadcast message or the dedicated control signaling comprises the frequency priority information about the inter-frequency measurement object.

6. The method according to claim 1, wherein after the selecting N frequencies with the highest priority to be measured from the at least one first frequency, the method further comprises:
   not performing, by the terminal, a measurement on the frequency except the N frequencies in the inter-frequency measurement object.

7. The method according to claim 1, wherein when the frequency information about the inter-frequency measurement object comprises frequency information about an intra-system inter-frequency frequency and frequency information about an inter-system frequency, N equals M−1, wherein N is the number of frequencies in the subset and M is a sum of (1) at least one intra-frequency frequency, (2) at least one intra-system inter-frequency frequency, and (3) at least one inter-system frequency supported by the terminal.

8. A method for determining a frequency to be measured, the method comprising:
   receiving, by a terminal, frequency information about an inter-frequency measurement object and frequency priority information about the inter-frequency measurement object, from a base station;
   determining, by the terminal, the number of at least one first frequency for the received inter-frequency measurement object according to the frequency information;
   when the determined number of the at least one first frequency is greater than the number of at least one second frequency for an inter-frequency measurement object supported by the terminal, selecting, by the terminal, N frequencies with a highest priority to be measured from the at least one first frequency according to the frequency priority information, wherein the N refers to the number of the at least one second frequency; and
   upon selecting the N frequencies, not performing, by the terminal, a measurement on the frequency except the N frequencies in the inter-frequency measurement object.

9. The method according to claim 8, wherein the at least one second frequency comprises at least one of the following:
   frequencies obtained according to a frequency measurement capability corresponding to a type of the inter-frequency measurement object; and frequencies obtained according to a frequency simultaneous measurement capability of an intra-system inter-frequency frequency and an inter-system frequency supported by the terminal.

10. A terminal comprising:
a receiver, configured to receive frequency information about an inter-frequency measurement object and frequency priority information about the inter-frequency measurement object;
a determining processor, configured to determine the number of at least one first frequency for the received inter-frequency measurement object according to the frequency information; and
a selecting processor, configured to select, when the number of the at least one first frequency determined by the determining processor is greater than the number of at least one second frequency for an inter-frequency measurement object supported by the terminal, according to the frequency priority information, at least one frequency to be measured from the at least one first frequency, wherein the number of the at least one frequency to be measured is equal to the number of the at least one second frequency;
wherein the selecting processor is further configured to select, according to the frequency priority information, N frequencies with a highest priority from the at least one first frequency, wherein the N refers to the number of the at least one second frequency.

11. The terminal according to claim 10, wherein the at least one second frequency comprises at least one of the following:
frequencies obtained according to a frequency measurement capability corresponding to a type of the inter-frequency measurement object; and
frequencies obtained according to a frequency simultaneous measurement capability of an intra-system inter-frequency frequency and an inter-system frequency supported by the terminal.

12. The terminal according to claim 10, wherein the frequency information about the inter-frequency measurement object comprises at least one of (a) frequency information about the intra-system inter-frequency frequencies and (b) frequency information about the inter-system frequencies.

13. The terminal according to claim 10, wherein the terminal further comprises a detector, which is configured to perform a first measurement on the N frequencies, wherein the first measurement refers to a measurement that meets a preset measurement indicator.

14. The terminal according to claim 10, wherein the receiver is further configured to receive a system broadcast message or a dedicated control signaling, wherein the system broadcast message or the dedicated control signaling comprises the frequency priority information about the inter-frequency measurement object.

15. The terminal according to claim 13, wherein the detector is further configured to:
not perform a measurement on the frequency except the N frequencies in the inter-frequency measurement object.

16. The terminal according to claim 10, wherein the frequency information about the inter-frequency measurement object comprises frequency information about an intra-system inter-frequency frequency and frequency information about an inter-system frequency, N equals M−1, wherein N is the number of frequencies in the subset and M is a sum of (1) at least one intra-frequency frequency, (2) at least one intra-system inter-frequency frequency, and (3) at least one inter-system frequency supported by the terminal.

* * * * *